United States Patent
Hung et al.

(10) Patent No.: US 11,126,829 B2
(45) Date of Patent: Sep. 21, 2021

(54) LIVE FACIAL RECOGNITION SYSTEM AND METHOD

(71) Applicant: Wistron Corporation, New Taipei (TW)

(72) Inventors: Chih-Yang Hung, New Taipei (TW); Yao-Tsung Chang, New Taipei (TW); Chuan-Yen Kao, New Taipei (TW)

(73) Assignee: Wistron Corporation, New Taipei (TW)

( * ) Notice: Subject to any disclaimer, the term of this patent is extended or adjusted under 35 U.S.C. 154(b) by 104 days.

(21) Appl. No.: 16/740,311

(22) Filed: Jan. 10, 2020

(65) Prior Publication Data

US 2021/0150189 A1    May 20, 2021

(30) Foreign Application Priority Data

Nov. 18, 2019 (TW) .................... 108141723

(51) Int. Cl.
*G06K 9/00* (2006.01)
*G06T 7/90* (2017.01)

(52) U.S. Cl.
CPC ..... *G06K 9/00288* (2013.01); *G06K 9/00268* (2013.01); *G06T 7/90* (2017.01); *G06K 2009/00939* (2013.01); *G06T 2207/30201* (2013.01)

(58) Field of Classification Search
CPC .......... G06K 9/00288; G06K 9/00268; G06K 2009/00939; G06T 7/90; G06T 2207/30201
See application file for complete search history.

(56) References Cited

U.S. PATENT DOCUMENTS

| | | | | |
|---|---|---|---|---|
| 9,495,008 B2 * | 11/2016 | Savastinuk | ........... | G06F 3/0346 |
| 9,665,784 B2 * | 5/2017 | Derakhshani | ...... | G06K 9/00906 |
| 10,380,444 B2 * | 8/2019 | Yuen | ................. | G06K 9/00906 |
| 10,835,135 B2 * | 11/2020 | Wu | ....................... | A61B 5/7207 |
| 10,842,393 B2 * | 11/2020 | Watanabe | ............... | A61B 6/563 |
| 2020/0288996 A1 * | 9/2020 | Yoshizawa | ........... | A61B 5/0077 |

FOREIGN PATENT DOCUMENTS

| | | |
|---|---|---|
| CN | 109101949 A | 12/2018 |
| CN | 110348385 A | 10/2019 |

OTHER PUBLICATIONS

Office Action dated Jun. 20, 2020 in corresponding Taiwan Patent Application No. 108141723.

\* cited by examiner

*Primary Examiner* — Phuoc Tran
(74) *Attorney, Agent, or Firm* — Donald E. Stout; Stout, Uxa & Buyan, LLP

(57) ABSTRACT

A live facial recognition method includes capturing a plurality of images of a face of a subject under recognition; obtaining time-varying data according to the images, the time-varying data representing a periodic variation of facial color of the subject under recognition due to facial vasoconstriction and vasodilation caused by heartbeat; and comparing the time-varying data with a predetermined frequency range. The subject under recognition is determined to be a living subject when the time-varying data is within the predetermined frequency range.

16 Claims, 9 Drawing Sheets

LIVE FACIAL RECOGNITION SYSTEM AND METHOD

CROSS-REFERENCE TO RELATED APPLICATIONS

This application claims priority of Taiwan Patent Application No. 108141723, filed on Nov. 18, 2019, the entire contents of which are herein expressly incorporated by reference.

BACKGROUND OF THE INVENTION

1. Field of the Invention

The present invention generally relates to facial recognition, and more particularly to a live facial recognition method and system.

2. Description of Related Art

Facial recognition is computer image processing capable of identifying facial features from a digital image or a video frame, and could be used as a security measure. Facial recognition is one of biometrics such as fingerprint or eye iris recognition. Facial recognition may be adapted to electronic devices such as computers, mobile phones and card readers. Particularly, as mobile devices are becoming more popular, the security measure is in high demand.

A conventional facial recognition system uses a two-dimensional (2D) camera to capture an image, from which facial features are extracted and compared with a database. However, the conventional facial recognition system usually cannot distinguish a real person from a picture while performing recognition, becoming a security loophole to be exploited.

In order to enhance reliability of the security measure, a facial recognition system is proposed to ask a user to act according to a given instruction such as swinging or rotating head, opening mouth or closing eyes. Further, some images may be captured while the user is acting on instruction, and accordingly depth information may be obtained and used to identify a real person. Nevertheless, those schemes take time and cause inconvenient.

A need has thus arisen to propose a novel facial recognition scheme capable of maintaining or enhancing reliability of the security measure, and accelerating facial recognition with convenience.

SUMMARY OF THE INVENTION

In view of the foregoing, it is an object of the embodiment of the present invention to provide a live facial recognition method and system capable of quickly recognizing a face accurately and conveniently.

According to one embodiment, a plurality of images of a face of a subject under recognition are captured. Time-varying data are obtained according to the images, the time-varying data representing a periodic variation of facial color of the subject under recognition due to facial vasoconstriction and vasodilation caused by heartbeat. The time-varying data is compared with a predetermined frequency range. The subject under recognition is determined to be a living subject when the time-varying data is within the predetermined frequency range.

DETAILED DESCRIPTION OF THE INVENTION

Figure 1A:
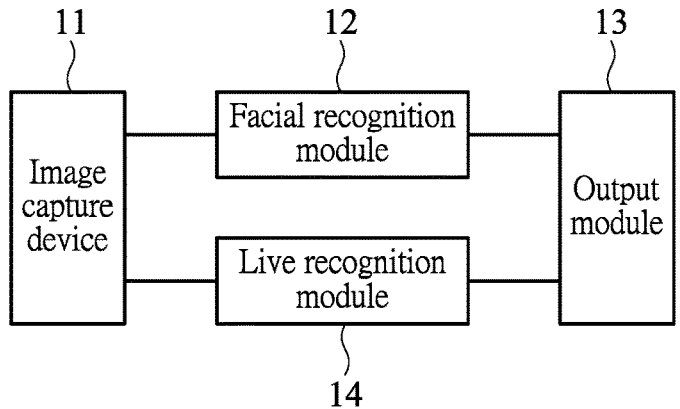
FIG. 1A shows a block diagram illustrating a live facial recognition system according to one embodiment of the present invention.
Figure 1B:
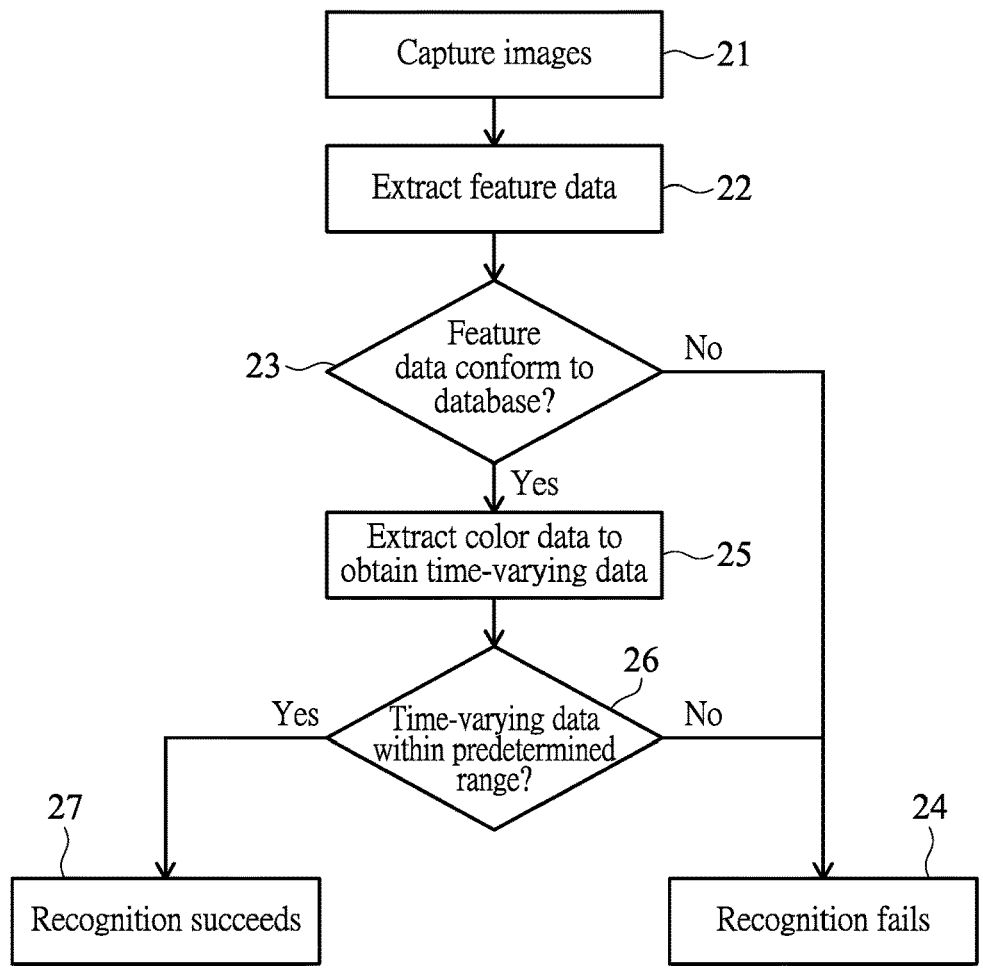
FIG. 1B shows a flow diagram illustrating a live facial recognition method according to one embodiment of the present invention.

FIG. 1A shows a block diagram illustrating a live facial recognition system 100 according to one embodiment of the present invention, and FIG. 1B shows a flow diagram illustrating a live facial recognition method 200A according to one embodiment of the present invention. The blocks of the live facial recognition system (system hereinafter) 100 and the steps of the live facial recognition method (method hereinafter) 200A may be implemented by hardware, software or their combination, for example, performed in a digital image processor.

In the embodiment, the system 100 may include an image capture device 11, such as a camera, configured to capture a plurality of images of a face of a subject under recognition (step 21) at a frame rate, for example, of 30 frames per second (FPS). The camera of the embodiment may be a two-dimensional (2D) camera or a three-dimensional (3D) camera (e.g., a 3D camera composed of two lenses or a 3D camera composed of a 2D camera and a depth detection device).

In the embodiment, the system 100 may include a facial recognition module 12 configured to extract at least one feature data (step 22) according to at least one of the images. In step 23, an output module 13 of the system 100 may compare the extracted feature data with a facial feature database (database hereinafter). If the extracted feature data does not conform to the database (i.e., difference therebetween is not less than a predetermined threshold, indicating that facial features therebetween are distinct), the output module 13 then determines that the recognition fails (step 24). If the extracted feature data conforms to the database, the flow of the method 200A then goes to step 25.

Figure 2A:
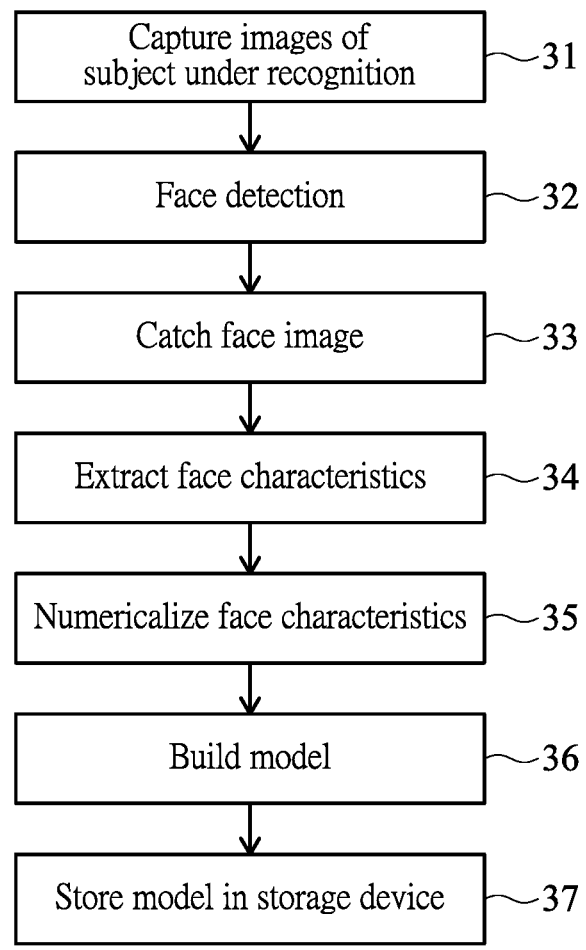
FIG. 2A shows a flow diagram illustrating a method of generating a database.
Figure 2B:
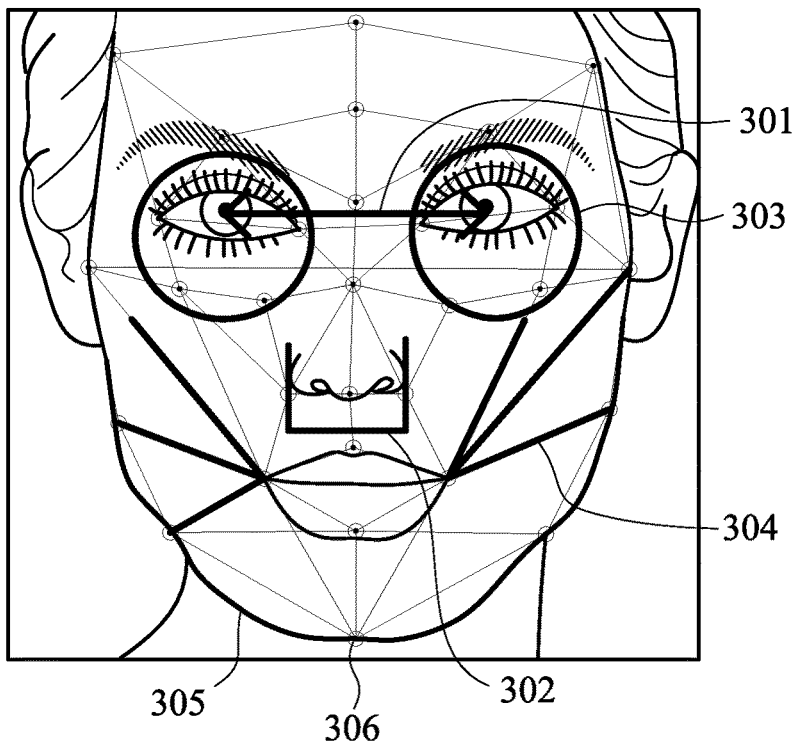
FIG. 2B shows exemplary face characteristics according to one embodiment of the present invention.

FIG. 2A shows a flow diagram illustrating a method 300 of generating a database. Specifically, in step 31, a camera may be used to capture an image of a subject under recognition. Next, in step 32, a processor may be used to perform face detection on the captured image. In step 33, a face image substantially covering a facial contour may be caught from the captured image according to results of the face detection. Subsequently, in step 34, the processor may extract or derive face characteristics from the face image. FIG. 2B shows exemplary face characteristics according to one embodiment of the present invention, including a distance 301 between eyes, a width 302 of a nose, depth 303 of an eye socket, a structure 304 of cheekbones, a length 305 of a jaw line and/or a chin point 306. In step 35, the processor may numericalize the face characteristics to generate facial feature values as feature data. Next, in step 36, a model is built according to the facial feature values, and a facial feature database is accordingly generated and stored in a storage device (step 37).

Figure 2C:
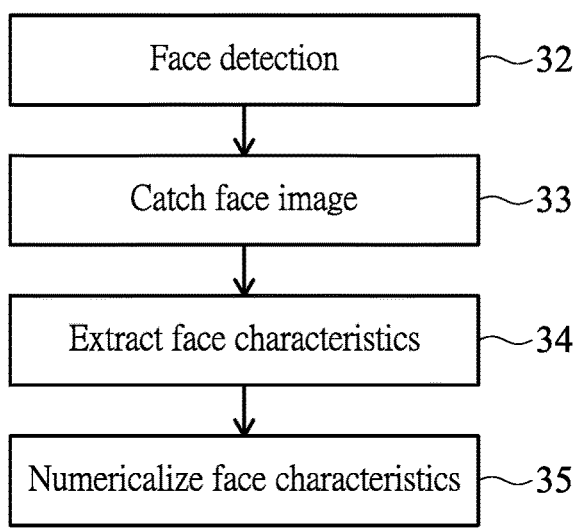
FIG. 2C shows a detailed flow diagram of step 22 in the method of FIG. 1B.

FIG. 2C shows a detailed flow diagram of step 22 in the method 200A of FIG. 1B. Extracting feature data of the face of the subject under recognition (step 22) is similar to steps 32-35 of FIG. 2A. Specifically, in step 32, the facial recognition module 12 may perform face detection on the captured image. In step 33, a face image substantially covering a facial contour may be caught from the captured image according to results of the face detection. Subsequently, in step 34, the facial recognition module 12 may extract or derive face characteristics from the face image. In step 35, the facial recognition module 12 may numericalize the face characteristics to generate facial feature values as feature data.

According to one aspect of the embodiment, the system 100 may include a live recognition module 14 configured to capture image data of at least one selected region (e.g., eye region, nose region or mouth region) of the face of the subject under recognition according to the images, to extract color data by processing the image data of the selected region, and to obtain time-varying data according to the color data, where the time-varying data represents a periodic variation of facial color of the subject under recognition due to facial vasoconstriction and vasodilation caused by heartbeat (step 25).

In the embodiment, the color data may be represented by three primary colors (e.g., red, green and blue), luminance-chrominance (e.g., YCbCr or YUV), luminance value, single color (e.g., single red, green or blue color value) or combination of two colors.

Figure 3A:
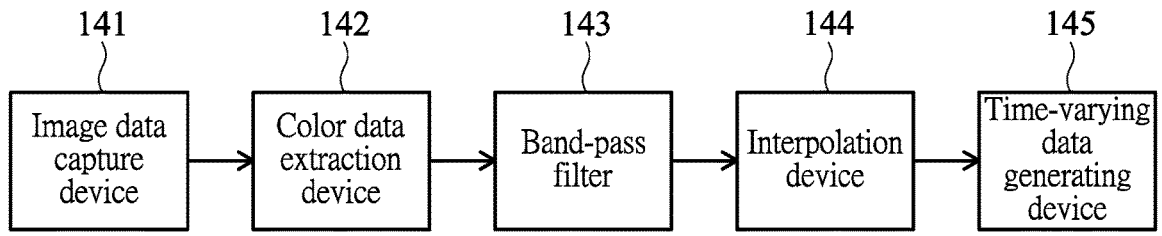
FIG. 3A shows a detailed block diagram of the live recognition module of FIG. 1A.
Figure 3B:
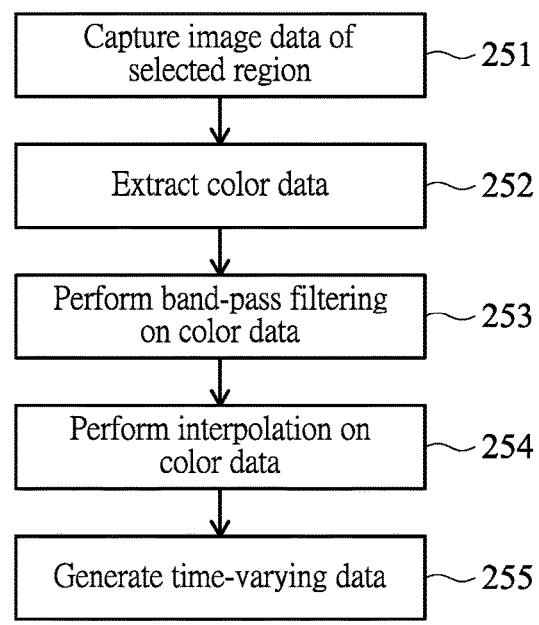
FIG. 3B shows a detailed flow diagram of step 25 of FIG. 1B.

FIG. 3A shows a detailed block diagram of the live recognition module 14 of FIG. 1A, and FIG. 3B shows a detailed flow diagram of step 25 of FIG. 1B. In the embodiment, the live recognition module 14 may include an image data capture device 141 coupled to receive the images, according to which image data of at least one selected region (e.g., eye region, nose region or mouth region) of the face of the subject under recognition may be captured (step 251).

Figure 4A:
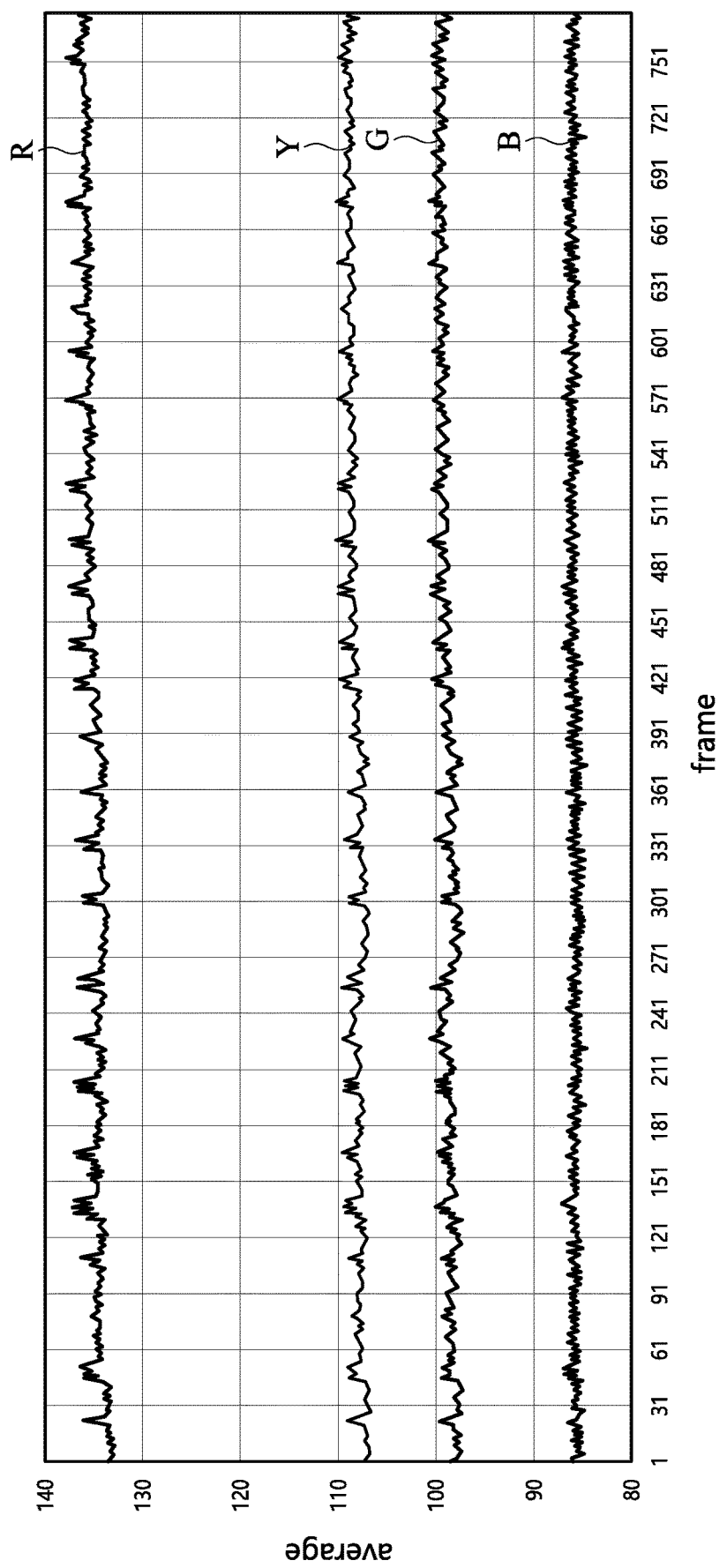
FIG. 4A exemplifies averages of red (R), green (G) and blue (B) as the color data of an eye region.

In the embodiment, the live recognition module 14 may include a color data extraction device 142 coupled to receive the image data, which may be processed to extract color data (step 252). In the embodiment, an average (e.g., arithmetic mean, median or mean of a middle (e.g., 50%) portion) of the image data may be obtained as the color data. In one embodiment, the color data may be presented by three primary colors (e.g., red, green and blue) and luminance-chrominance (e.g., YCbCr) with the following relationship:

$Y=0.299R+0.587G+0.114B$ $Cb=0.564(B-Y)$ $Cr=0.713(R-Y)$ $R=Y+1.402Cr$ $G=Y-0.344Cb-0.714Cr$ $B=Y+1.772Cb$ where Y represents luminance, Cb represents blue-difference chrominance and Cr represents red-difference chrominance. FIG. 4A exemplifies averages of red (R), green (G) and blue (B) as the color data of an eye region.

Figure 4B:
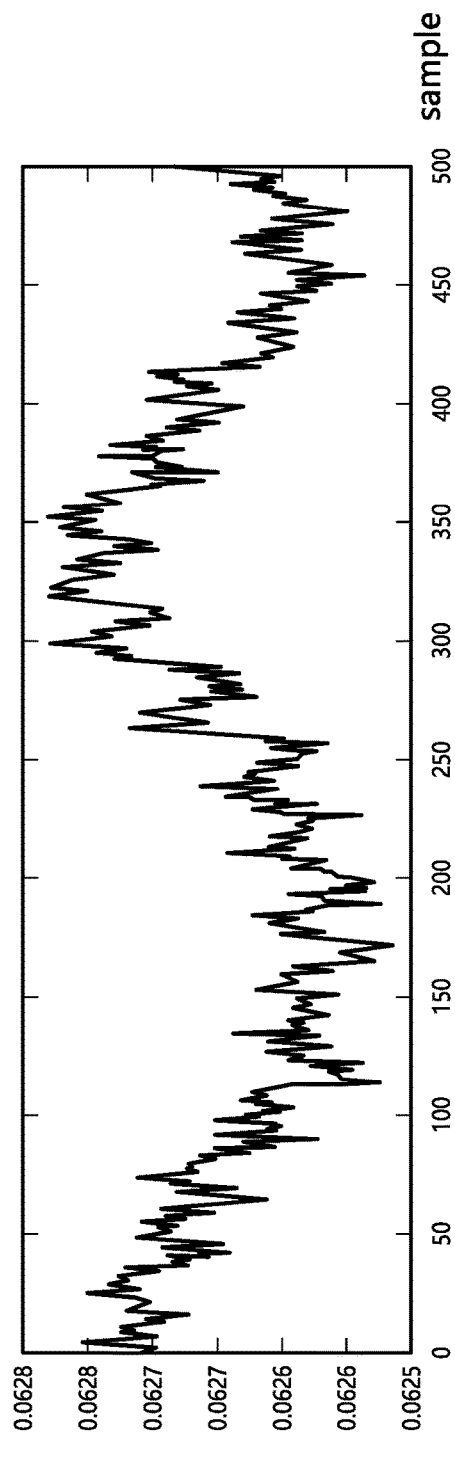
FIG. 4B exemplifies signal strength of a sum of blue-difference chrominance (Cb) and red-difference chrominance (Cr)
Figure 4C:
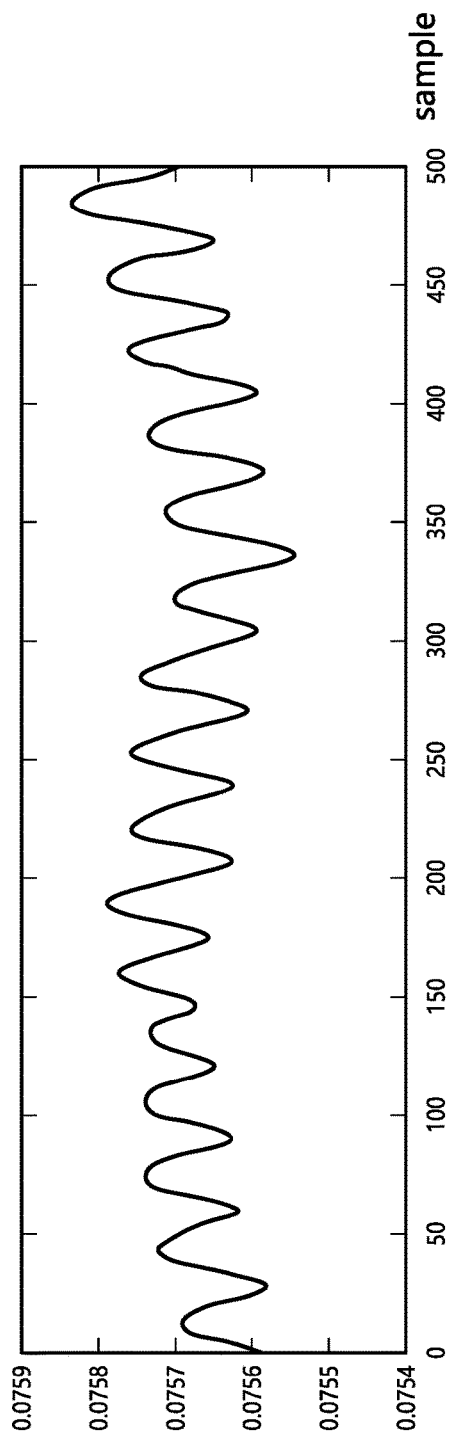
FIG. 4C shows signal strength of FIG. 4B after band-pass filtering.

In the embodiment, the live recognition module 14 may include a band-pass filter 143 configured to perform band-pass filtering on the color data (step 253) to pass frequencies within a predetermined frequency range (e.g., normal heartbeat frequency range such as 0.75-4 Hz) and rejects noise outside the predetermined frequency range, thereby obtaining smoother color data. FIG. 4B exemplifies signal strength of a sum of blue-difference chrominance (Cb) and red-difference chrominance (Cr) at a frame (or sample) rate of 30 FPS, and FIG. 4C shows signal strength of FIG. 4B after band-pass filtering.

Figure 4D:
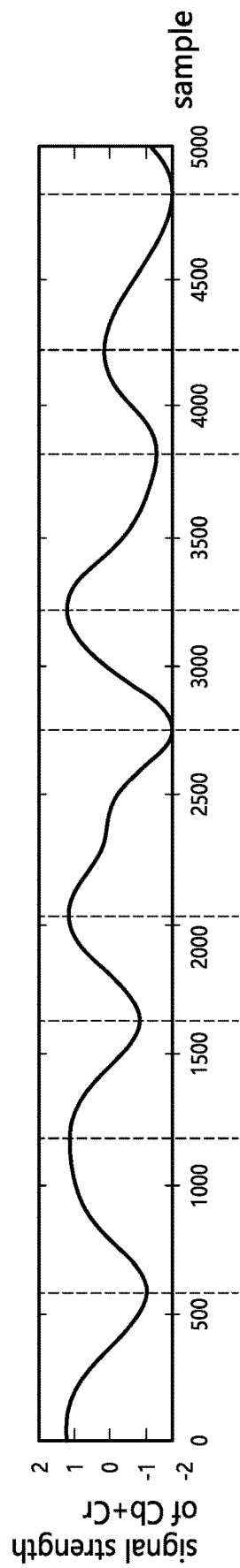
FIG. 4D shows signal strength of FIG. 4B after interpolation.

In the embodiment, the live recognition module 14 may include an interpolation device 144 configured to preform interpolation on the color data to increase the sample rate (step 254), thereby smoothing signal and increasing bandwidth. FIG. 4D shows signal strength of FIG. 4B after interpolation.

In the embodiment, the live recognition module 14 may include a time-varying data generating device 145 configured to generate time-varying data according to the (band-pass filtered and/or interpolated) color data (step 255) to represent a periodic variation of facial color of the subject under recognition due to facial vasoconstriction and vasodilation caused by heartbeat.

Figure 4E:
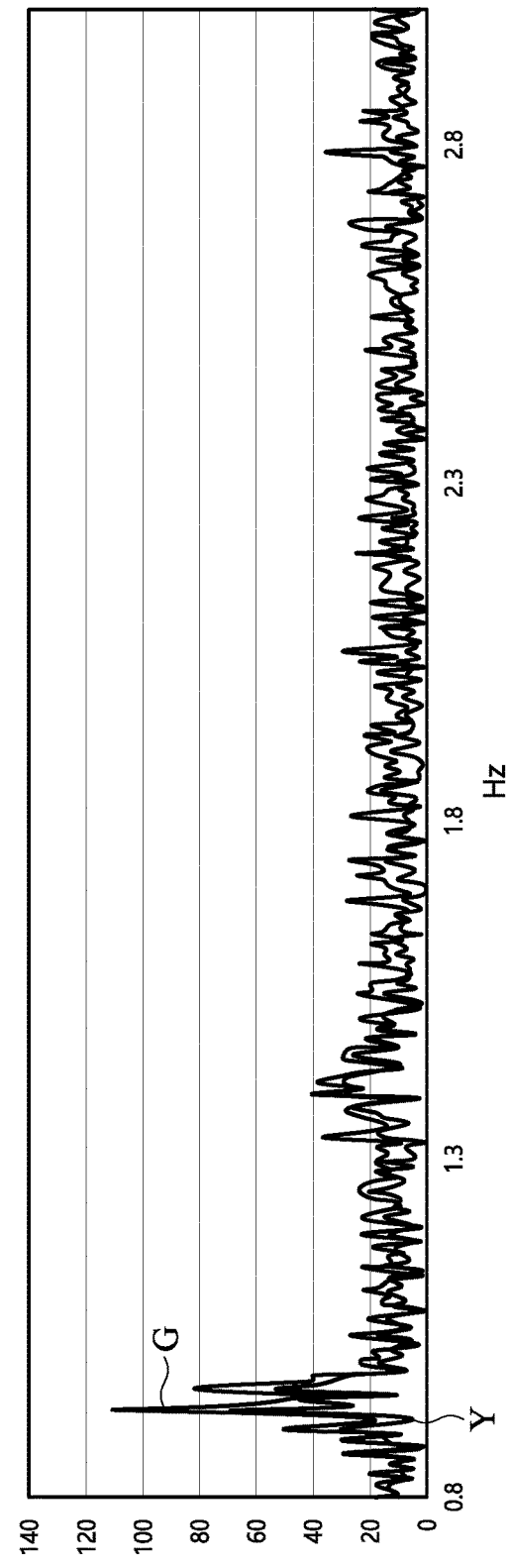
FIG. 4E exemplifies green (G) and luminance (Y) of the color data after transformation to frequency domain.
Figures 4F, 4G:
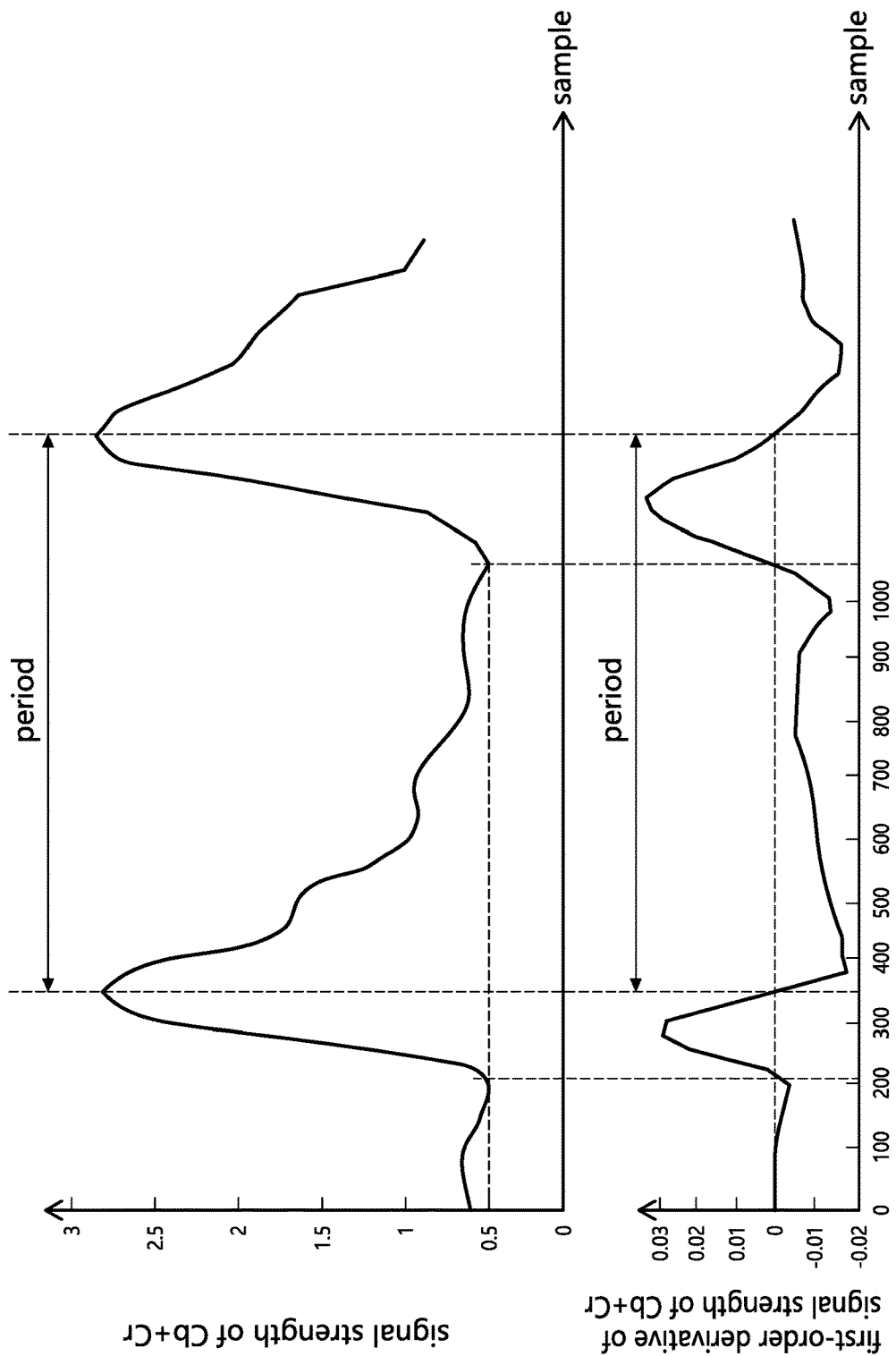
FIG. 4F exemplifies signal strength of a sum of blue-difference chrominance (Cb) and red-difference chrominance (Cr)
FIG. 4G shows a first-order derivative of the signal of FIG. 4F.

In one embodiment, the time-varying data generating device 145 may transform the color data from time domain to frequency domain, for example, by fast Fourier transform (FFT), and the frequency corresponding to maximum strength is then taken as the time-varying data. FIG. 4E exemplifies green (G) and luminance (Y) of the color data after transformation to frequency domain. In another embodiment, a length of time between neighboring two signal peaks (or valleys) in the time-domain color data is obtained as a period, a reciprocal of which is obtained as the time-varying data. Alternatively, a length of time between neighboring (n+1) signal peaks (or valleys) is divided by n to obtain an average period, a reciprocal of which is obtained as the time-varying data. FIG. 4F exemplifies signal strength of a sum of blue-difference chrominance (Cb) and red-difference chrominance (Cr), where a length of time between neighboring two signal peaks is obtained as the period. In a further embodiment, a first-order derivative of the time-domain color data is obtained, where a zero-crossing point with a negative slope represents signal peak, and a zero-crossing point with a positive slope represents signal valley. A length of time between neighboring two signal peaks (or valleys) is obtained as a period, a reciprocal of which is obtained as the time-varying data. FIG. 4G shows a first-order derivative of the signal of FIG. 4F.

Referring back to FIG. 1B, in step 26, the output module 13 may compare the time-varying data with a predetermined frequency range (e.g., normal heartbeat frequency range such as 0.75-4 Hz). If the time-varying data is within the predetermined frequency range, indicating that the subject under recognition is a living subject, the output module 13 may then determine that the recognition succeeds (step 27). If the time-varying data is not within the predetermined frequency range, indicating that the subject under recognition is not a living subject, the output module 13 may then determine that the recognition fails (step 24).

Figure 1C:
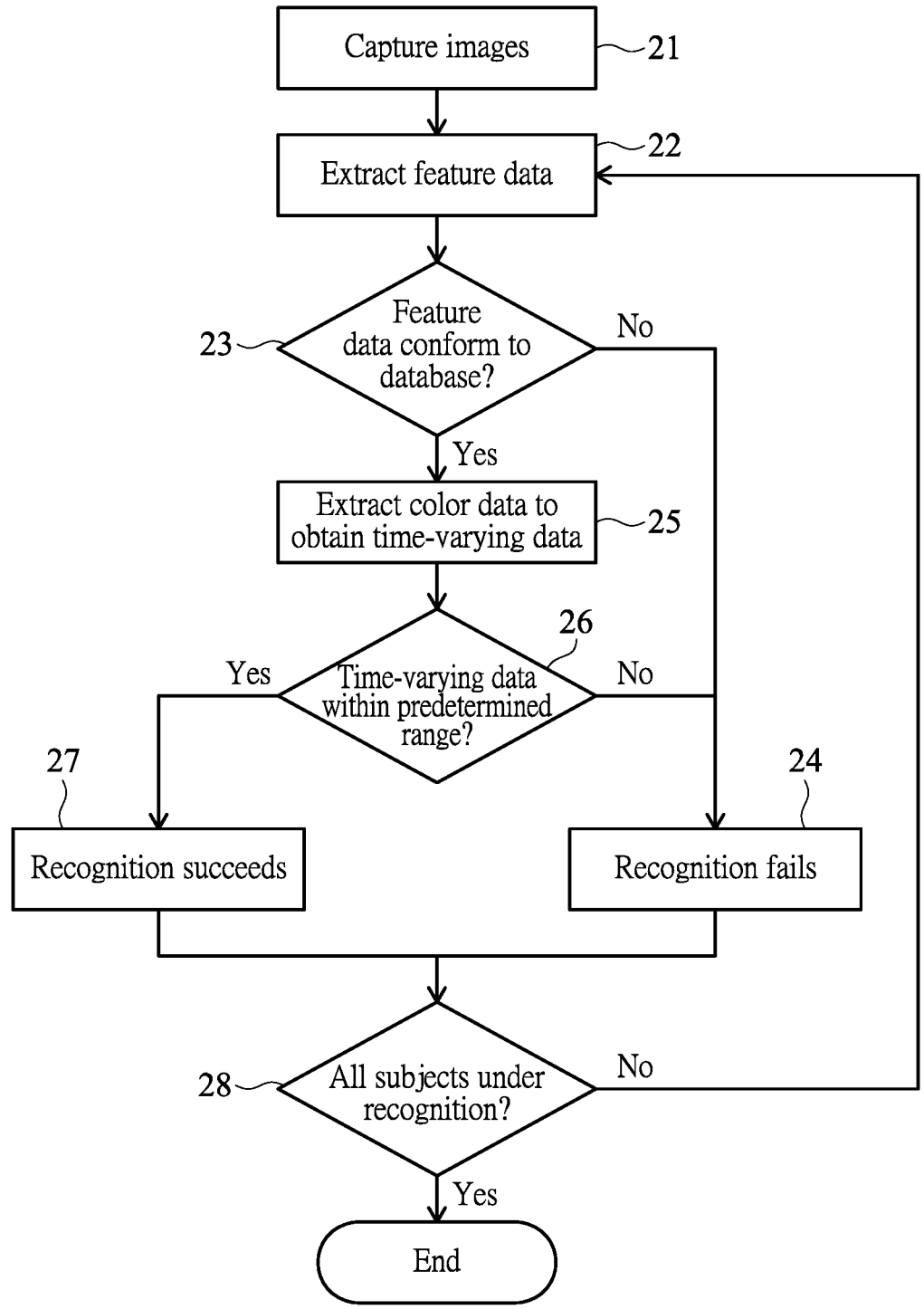
FIG. 1C shows a flow diagram illustrating a live facial recognition method according to another embodiment of the present invention.

FIG. 1C shows a flow diagram illustrating a live facial recognition method 200B according to another embodiment of the present invention. The live facial recognition method (method hereinafter) 200B is similar to the method 200A of FIG. 1B, with the exception that the method 200B may be adapted to multi-person live facial recognition. Specifically, in step 21, the image capture device 11 may capture images of faces of plural subjects under recognition. In step 22, the facial recognition module 12 may extract at least one feature data of one subject under recognition according to at least one of the images. Next, in step 23, the output module 13 may compare the extracted feature data with a facial feature database (database hereinafter). If the extracted feature data does not conform to the database (i.e., difference therebetween is not less than a predetermined threshold, indicating that facial features therebetween are distinct), the output module 13 then determines that the recognition fails (step 24). If the extracted feature data conforms to the database, the flow of the method 200B then goes to step 25.

In step 25, the live recognition module 14 may capture image data of at least one selected region (e.g., eye region, nose region or mouth region) of the face of the subject under recognition according to the images, to extract color data by processing the image data of the selected region, and to obtain time-varying data according to the color data. In step 26, the output module 13 may compare the time-varying data with a predetermined frequency range (e.g., normal heartbeat frequency range such as 0.75-4 Hz). If the time-varying data is within the predetermined frequency range, indicating that the subject under recognition is a living subject, the output module 13 may then determine that the recognition succeeds (step 27). If the time-varying data is not within the predetermined frequency range, indicating that the subject under recognition is not a living subject, the output module 13 may then determine that the recognition fails (step 24). After determining that the recognition fails (step 24) or succeeds (step 27), the flow goes to step 28 to determine whether all subjects under recognition have been processed. If the determination is negative, the flow goes back to step 22 to process a next subject under recognition.

Although specific embodiments have been illustrated and described, it will be appreciated by those skilled in the art that various modifications may be made without departing from the scope of the present invention, which is intended to be limited solely by the appended claims.

What is claimed is:

1. A live facial recognition method, comprising:
   (a) capturing a plurality of images of a face of a subject under recognition;
   (b) obtaining time-varying data according to the images, the time-varying data representing a periodic variation of facial color of the subject under recognition due to facial vasoconstriction and vasodilation caused by heartbeat; and
   (c) comparing the time-varying data with a predetermined frequency range;
   wherein the subject under recognition is determined to be a living subject when the time-varying data is within the predetermined frequency range.

2. The method of claim 1, wherein the step (b) comprises:
   (b1) capturing image data of at least one selected region of the face of the subject under recognition according to the images;
   (b2) processing the image data to extract color data; and
   (b3) generating the time-varying data according to the color data.

3. The method of claim 2, wherein the step (b2) comprises:
   obtaining an average of the image data as the color data.

4. The method of claim 2, wherein the step (b) further comprises:
   performing band-pass filtering on the color data to pass frequencies within the predetermined frequency range.

5. The method of claim 2, wherein the step (b) further comprises:
   performing interpolation on the color data to increase sample rate.

6. The method of claim 2, wherein the step (b3) comprises:
   transforming the color data from time domain to frequency domain, and taking a frequency corresponding to maximum strength as the time-varying data.

7. The method of claim 2, wherein the step (b3) comprises:
   obtaining a length of time between neighboring two signal peaks or valleys of the color data in time domain as a period, a reciprocal of which is obtained as the time-varying data.

8. The method of claim 1, before the step (b), further comprising:
   extracting at least one feature data according to at least one of the images; and
   comparing the feature data with a facial feature database.

9. A live facial recognition system, comprising:
   an image capture device comprising at least one camera and being configured to capture a plurality of images of a face of a subject under recognition;
   at least one processor being coupled to the image capture device and comprising:
   a live recognition module configured to obtain time-varying data according to the images, the time-varying data representing a periodic variation of facial color of the subject under recognition due to facial vasoconstriction and vasodilation caused by heartbeat; and
   an output module configured to compare the time-varying data with a predetermined frequency range;
   wherein the subject under recognition is determined to be a living subject when the time-varying data is within the predetermined frequency range.

10. The system of claim 9, wherein the live recognition module comprises:
    an image data capture device that captures image data of at least one selected region of the face of the subject under recognition according to the images;
    a color data extraction device that processes the image data to extract color data; and
    a time-varying data generating device that generates the time-varying data according to the color data.

11. The system of claim 10, wherein the color data extraction device obtains an average of the image data as the color data.

12. The system of claim 10, wherein the live recognition module further comprises:

a band-pass filter that performs band-pass filtering on the color data to pass frequencies within the predetermined frequency range.

13. The system of claim 10, wherein the live recognition module further comprises:
an interpolation device that performs interpolation on the color data to increase sample rate.

14. The system of claim 10, wherein the time-varying data generating device transforms the color data from time domain to frequency domain, and takes a frequency corresponding to maximum strength as the time-varying data.

15. The system of claim 10, wherein the time-varying data generating device obtains a length of time between neighboring two signal peaks or valleys of the color data in time domain as a period, a reciprocal of which is obtained as the time-varying data.

16. The system of claim 9, wherein the at least one processor further comprises:
a facial recognition module configured to extract at least one feature data according to at least one of the images, and compares the feature data with a facial feature database.

* * * * *